Patented Dec. 12, 1933

1,938,870

UNITED STATES PATENT OFFICE 1,938,870

POLYMERIZING VINYL COMPOUNDS

Leland C. Shriver, Charleston, W. Va., assignor to Carbide and Carbon Chemicals Corporation, a corporation of New York No Drawing. Application January 29, 1932
Serial No. 589,773

7 Claims. (Cl. 260—2)

Vinyl compounds can be polymerized to form resinous products for which various uses have been proposed. In general, the known methods for forming these resinous bodies from vinyl compounds are treatment of the compounds with heat, actinic light, or a catalyst, or various combinations of these measures. Many catalysts have been suggested for promoting the polymerizing action. Among the catalytic substances which have met with greatest favor for this purpose are lead tetraethyl and certain active oxidizing agents, such as dibenzoyl peroxide.

It is the chief object of my invention to provide a new catalyst for polymerizing vinyl compounds, and a process involving this catalyst. I have discovered that acetyl benzoyl peroxide ($CH_3.CO.O.O.CO.C_6H_5$), is an excellent polymerizing catalyst, especially for the polymerization of vinyl halides such as vinyl chloride, vinyl esters of aliphatic acids such as vinyl acetate, vinyl propionate, vinyl butyrate etc., other vinyl derivatives, e. g. vinyl benzene (styrene), or related vinyl compounds, or mixtures of these vinyl compounds. The resinous products obtained by polymerizing vinyl compounds in the presence of acetyl benzoyl peroxide are more stable with respect to exposure to heat and light, and they may be obtained more economically and quickly than by the use of previously known catalysts and processes.

Vinyl resins (by which are meant the above mentioned resinous products) have been previously made, and by means of various expedients have been rendered stable, heat and light resistant, and generally improved. One of the difficulties to be overcome in the preparation of a stable resin made, for example, with dibenzoyl peroxide as a catalyst, is the elimination of catalytic residues from the polymerized product. Although the amount of dibenzoyl peroxide used may be the minimum amount which will produce a satisfactory polymer, the decomposition of this peroxide in the process is never sufficiently complete to eliminate catalytic residues from the resin, and additional measures must be adopted. Also, previously used catalysts, notably dibenzoyl peroxide, do not immediately effect the polymerization and a certain time of inactivity is lost before the polymerization is initiated.

The new catalyst not only mitigates these objectionable features, but makes possible greater economy in the process of polymerization because it can be used in lower concentrations than other catalysts, and because the actual cost of the new catalyst is less than that of dibenzoyl peroxide, for example.

The following example will serve to illustrate the invention:

Acetyl benzoyl peroxide was prepared by passing dry air or oxygen through a mixture of about four parts by weight of benzaldehyde and three parts by weight of acetic anhydride until tests showed no further peroxide formation. A convenient test for indicating this formation is by measuring the liberation of iodine from a solution of potassium iodide. The mixture as produced may be used directly as the catalysts, or the acetyl benzoyl perioxide may be isolated from the reaction mixture and purified.

A charge of vinyl compounds consisting of 2000 parts by weight of vinyl chloride, 500 parts by weight of vinyl acetate together with 2500 parts by weight of acetone  was placed in an autoclave and to this mixture was added an amount of the crude catalyst equivalent to 7.5 parts by weight of contained acetyl benzoyl peroxide. The contents of the autoclave were then maintained at 40° C. until the vinyl compounds were polymerized, which in this case was 32 hours. The resulting resin was tough, and possessed good mechanical strength. This resin was more stable to heat than similarly prepared resins made with dibenzoyl peroxide as a cataylst.

Among the advantages of my new catalyst as compared to other previously used catalysts, of which dibenzoyl peroxide is representative, are:

Smaller concentrations of catalyst are required. One part of acetyl benzoyl peroxide contains as much peroxide oxygen (assumed to be the effective part of the compound) as 1.34 parts of dibenzoyl peroxide; and in activity the new catalyst surpasses dibenzoyl by a still wider margin than would be expected from this relation. I have found that a concentration of the new catalyst equal to between about 0.15% and about 0.3% of the weight of vinyl compounds present is sufficient, whereas approximately 1.0% of dibenzoyl peroxide was required. In general, I prefer to use less than about 1% of my new catalyst, and to operate the polymerization process below about 40° C.

There is less residual catalyst in the resins produced, hence, the stability of the resin is increased. This is true because less of the new catalyst is used originally and because it is more completely utilized in the reaction due to its greater activity. Also, the residual amounts of the acetyl benzoyl peroxide catalyst may be more easily eliminated from the resin produced, because it is more active, and is more easily decomposable in the elimination.

The time required to obtain equivalent resin yields with my new catalyst is less than that necessary with other catalysts, because polymerization begins more quickly due to the greater activity of the new catalyst.

Acetyl benzoyl peroxide may be used in conjunction with other catalysts, promoters and accelerating agents, and may be used in many modifications and variations of vinyl resin production processes.

I claim:

1. Process which comprises polymerizing vinyl chloride in the presence of acetyl benzoyl peroxide.

2. Process which comprises polymerizing vinyl acetate in the presence of acetyl benzoyl peroxide.

3. Process which comprises polymerizing a mixture of vinyl chloride and vinyl acetate in the presence of acetyl benzoyl peroxide.

4. Process which comprises polymerizing vinyl compounds of the group consisting of vinyl halides, vinyl esters of aliphatic acids, vinyl benzene and mixtures of these compounds in the presence of acetyl benzoyl peroxide.

5. Process which comprises polymerizing vinyl compounds of the group consisting of vinyl halides, vinyl esters of aliphatic acids, vinyl benzene and mixtures of these compounds in the presence of less than about 1% of acetyl benzoyl peroxide based on the weight of vinyl compounds.

6. Process for polymerizing vinyl compounds of the group consisting of vinyl halides, vinyl esters of aliphatic acids, vinyl benzene and mixtures of these compounds, which comprises subjecting the vinyl compounds to a temperature below about 40° C. in the presence of less than about 1% by weight of acetyl benzoyl peroxide.

7. Process for polymerizing vinyl compounds of the group consisting of vinyl halides, vinyl esters of aliphatic acids, vinyl benzene and mixtures of these compounds, which comprises subjecting the vinyl compounds to a temperature below about 40° C. in the presence of from about 0.15% to about 0.3% by weight of acetyl benzoyl peroxide.

LELAND C. SHRIVER.